United States Patent
Pritzer

(10) Patent No.: US 6,729,792 B2
(45) Date of Patent: May 4, 2004

(54) RING FOR CONNECTING TWO ROTATIONALLY SYMMETRICAL STRUCTURAL PARTS AND METHOD OF MAKING SAME

(75) Inventor: Wolfgang Pritzer, Daisendorf (DE)

(73) Assignee: Astrium GmbH, Friedrichsafen (DE)

( * ) Notice: Subject to any disclaimer, the term of this patent is extended or adjusted under 35 U.S.C. 154(b) by 0 days.

(21) Appl. No.: 10/095,430

(22) Filed: Mar. 13, 2002

(65) Prior Publication Data

US 2002/0146278 A1 Oct. 10, 2002

(30) Foreign Application Priority Data

Mar. 13, 2001 (DE) .......................... 101 11 896

(51) Int. Cl.[7] .................................. B64G 1/64
(52) U.S. Cl. .................. 403/286; 403/287; 244/131
(58) Field of Search ................ 244/131, 161, 244/158 R; 403/286, 287, 288, 292, 293, 353

(56) References Cited

U.S. PATENT DOCUMENTS

| 3,116,547 | A | | 1/1964 | Nepple |
| 5,062,844 | A | * | 11/1991 | Jamison et al. ............... 606/54 |
| 6,076,467 | A | * | 6/2000 | Cespedosa et al. ......... 102/378 |
| 6,217,282 | B1 | * | 4/2001 | Stanka .................... 415/209.2 |
| 2002/0178583 | A1 | * | 12/2002 | Holman et al. ............... 29/897 |

FOREIGN PATENT DOCUMENTS

GB          2 196 922 A       5/1988

* cited by examiner

*Primary Examiner*—John R. Cottingham
(74) *Attorney, Agent, or Firm*—Crowell & Moring LLP

(57) ABSTRACT

A ring connects two rotationally symmetrical structural parts to form a rotationally symmetrical light-weight structure. At the transition between the two structural parts, there is a change of the slope of the meridian line of the light-weight structure. The ring comprises a surrounding layer of carbon fiber reinforced plastic CFRP with carbon fibers oriented in a circumferential direction of the structural parts.

24 Claims, 4 Drawing Sheets

RING FOR CONNECTING TWO ROTATIONALLY SYMMETRICAL STRUCTURAL PARTS AND METHOD OF MAKING SAME

BACKGROUND OF THE INVENTION

This application claims the priority of 101 11 896.1-22, filed in Germany on Mar. 13, 2001, the disclosure(s) of which is (are) expressly incorporated by reference herein.

The invention relates to a ring for connecting two rotationally symmetrical structural parts to form a rotationally symmetrical light-weight structure.

Structural parts of aerospace transport systems are conventionally connected by aluminum rings. The rings usually have a screwed interface or a pyrotechnically separable interface with the adjoining structural parts. These rings are used particularly for connecting conical structures with cylindrical structures. At the transition from the conical to the cylindrical structure, the axial loads must be deflected. This deflection generates high radial forces and deformations as a function of the cone angle. Apart from the loading, the stiffness therefore also seriously decreases in the axial and radial direction. For large aerospace transport systems which are based on this type of structure, such as the European carrier rocket Ariane 5, it is problematic to meet the requirements with respect to the stiffness connected with the lowest empty weight.

It is an object of the invention to develop a design by means of which, in the case of rotationally symmetrical light-weight structures, the required stiffnesses and stabilities can be met at the lowest weight.

This task is achieved according to certain preferred embodiments of the invention by providing a ring for connecting two rotationally symmetrical structural parts to form a rotationally symmetrical light-weight structure where a change of slope of a meridian line of the light-weight structure is situated at the transition between the two structural parts, wherein the ring comprises continuously wound reinforcement of carbon fiber reinforced plastic CFRP which has carbon fibers oriented in circumferential direction of the structural parts. Advantageous further developments of the invention are described herein and in the claims.

The ring according to the invention for the connection of two rotationally symmetrical structural parts to form a rotationally symmetrical lightweight construction has a surrounding laying of carbon-fiber-reinforced plastic (CFRP) with carbon fibers oriented in the circumferential direction.

By means of the ring according to the invention, the high radial forces can be absorbed which exist at the transition area between the two structural parts as a result of the change of the slope of the meridian line of the light-weight structure.

The invention comprises particularly two basic embodiments:

1. The reinforcement of metallic rings (in the following also called "basic ring") by a ring of continuously wound CFRP.
2. A ring of continuously wound CFRP without a metallic ring.

Advantages of the invention:
Low weight;
low volume requirement;
simple adaptation of the stiffness of the overall structure to the respective demands, also in a very late stage of a project.

Other objects, advantages and novel features of the present invention will become apparent from the following detailed description of the invention when considered in conjunction with the accompanying drawings.

DETAILED DESCRIPTION OF THE DRAWINGS

Figure 1:
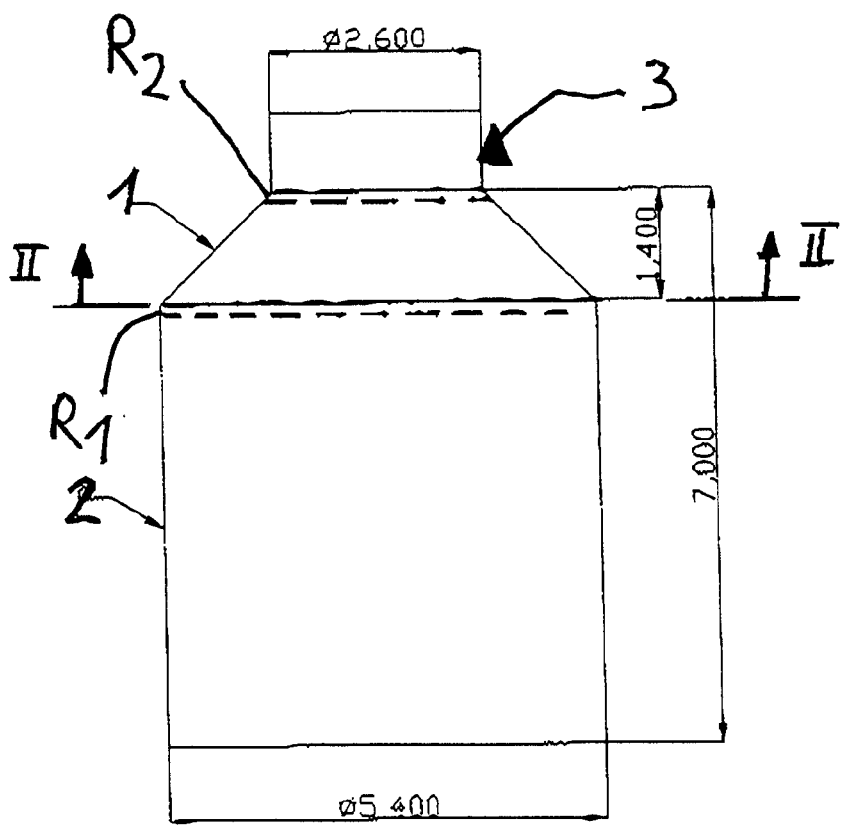
FIG. 1 is a schematic side view of a rocket assembly formed with a conical structural part and two cylindrical structural parts connected together with two connecting ring assemblies constructed according to preferred embodiments of the invention.
Figure 2:
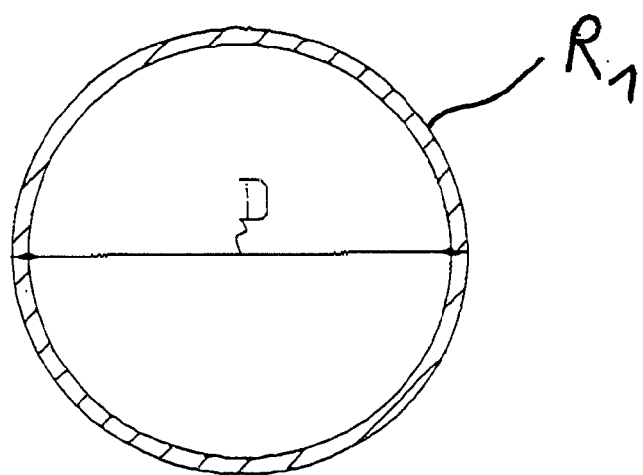
FIG. 2 is a schematic sectional view taken along section plane II—II of FIG. 1 and schematically depicting a connecting ring assembly constructed according to preferred embodiments of the present invention.

FIGS. 1 and 2 schematically depict a rocket assembly having a conical structural part 1 connected at location "$R_1$" with a cylindrical part 2 by a connecting ring assembly constructed according to preferred embodiments of the invention. Contemplated embodiments include relatively large structural parts.

Figure 4:
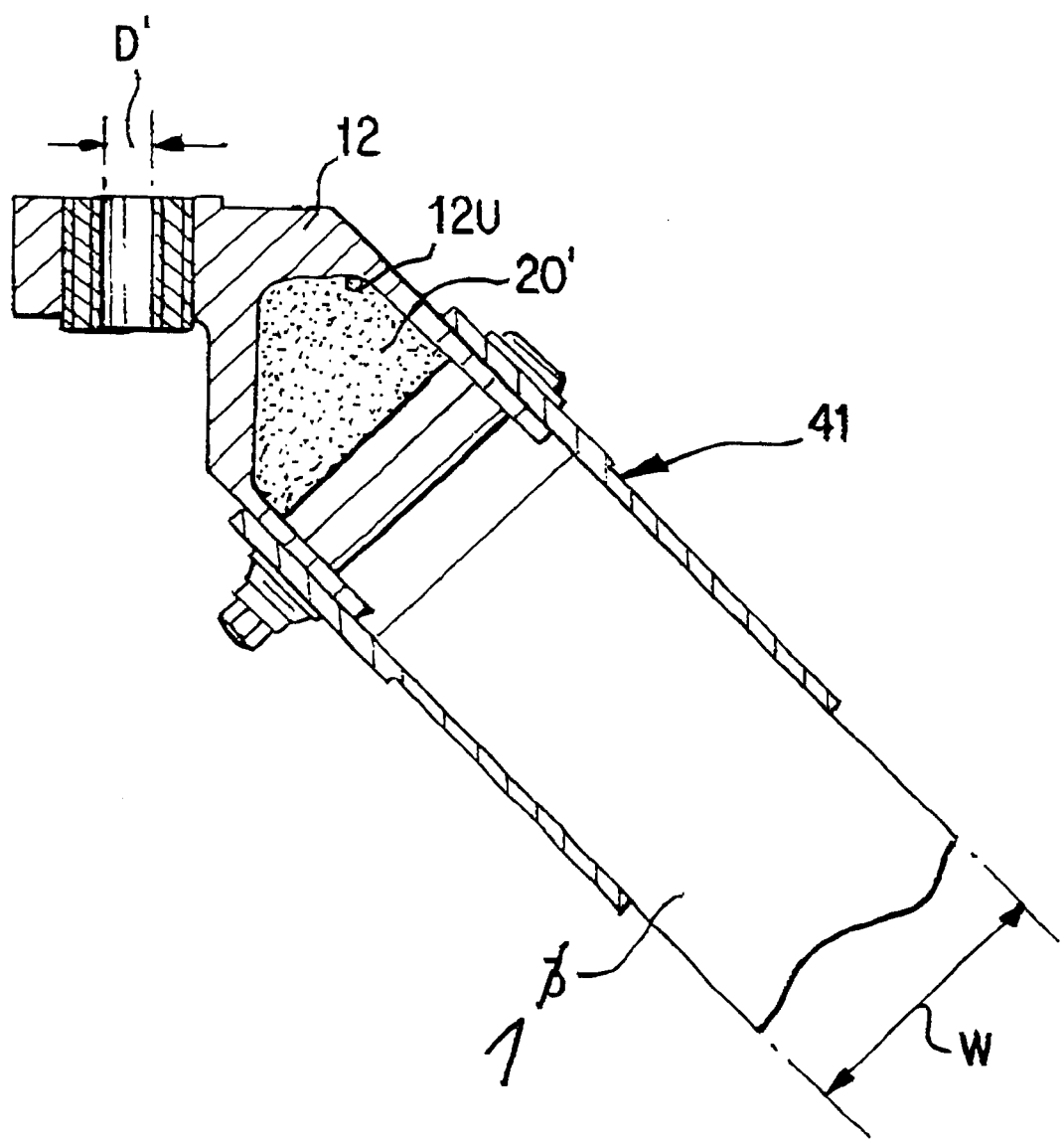
FIG. 4 is an enlarged sectional view of a connecting ring assembly for connecting the conical structural part and the upper cylindrical structural part of FIG. 1, constructed according to a second preferred embodiment of the present invention.

FIGS. 1 and 4 schematically depict the rocket assembly having the conical structural part 1 connected at location "$R_2$" with another cylindrical part 3 by a connecting ring assembly constructed according to preferred embodiments of the invention (cylindrical part 3=payload adapter). For example, for an Ariane 5 carrier rocket, the diameter D would be about 5.4 meters.

For the connection of additional structural parts in addition to the connection of conical and cylindrical parts 1, 2, a metallic ring 10 (FIG. 3), 12 (FIG. 4) is utilized. The ring assembly may have an interface for a further connection structure, such flange 7 with a track of holes 7H for a screwed connection, such as shown in FIG. 3.

Since the structural parts 1, 2, 3 to be connected are light-weight structures, these are constructed as sandwich structures by means of honeycombs as a core and cover layers made of CFRP. It is the result of the geometry of a relatively thick cross-section of a sandwich and the demand for a light connection ring that, in their cross-section, the rings 10, 12 of the embodiments of FIGS. 3 and 4 have U-shaped regions 10U, 12U for the connection (by means of threaded blind rivets 40 or by means of gluing) to the cover layers of the structural parts 1, 2, 3. The connection of the sandwich structure with the ring takes place predominantly by way of shear lap joints 41.

Figure 3:
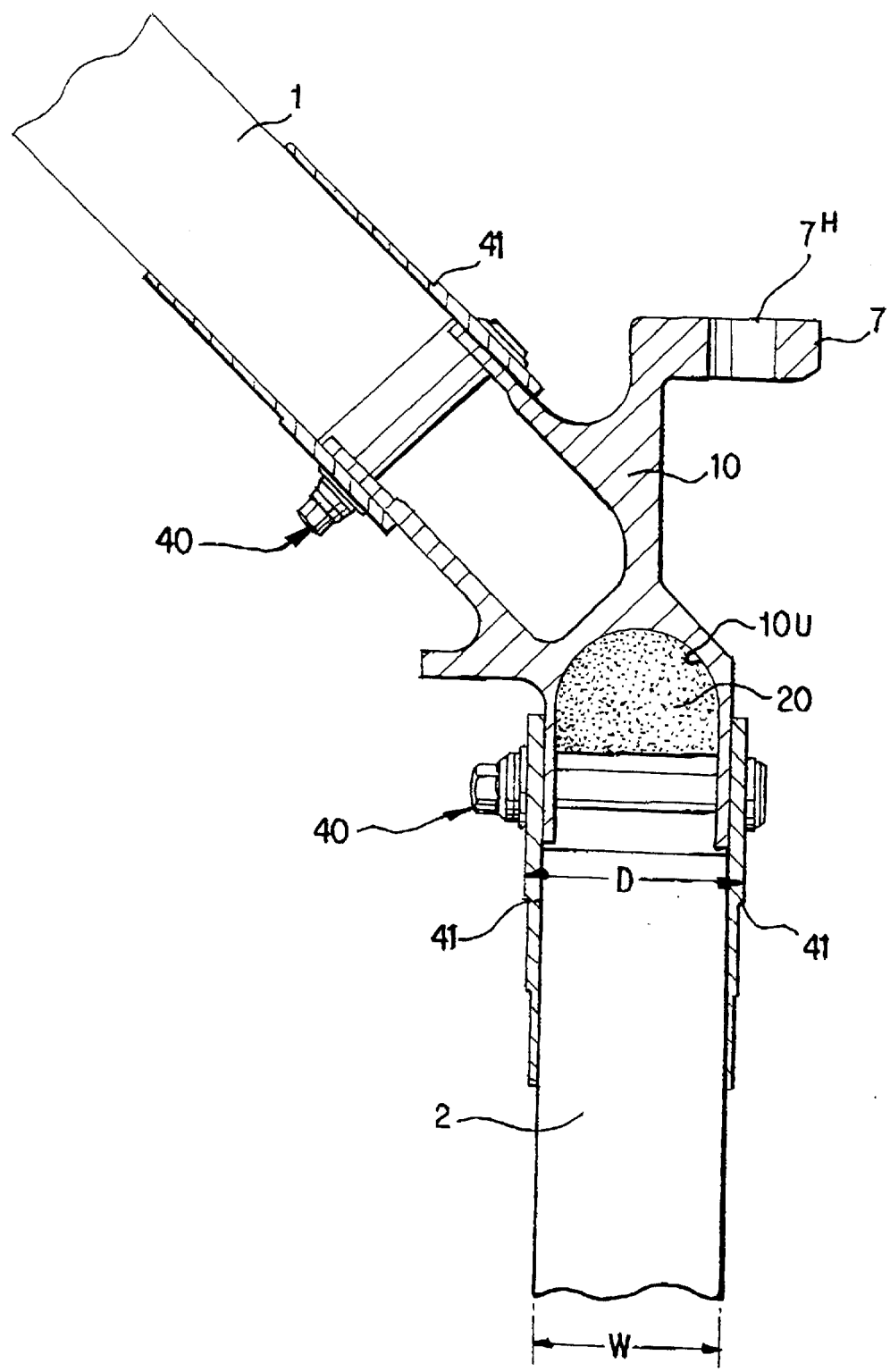
FIG. 3 is an enlarged sectional view of a connecting ring assembly for connecting the conical structural part and the lower cylindrical structural part of FIG. 1, constructed according to a first preferred embodiment of the present invention.
Figure 5:
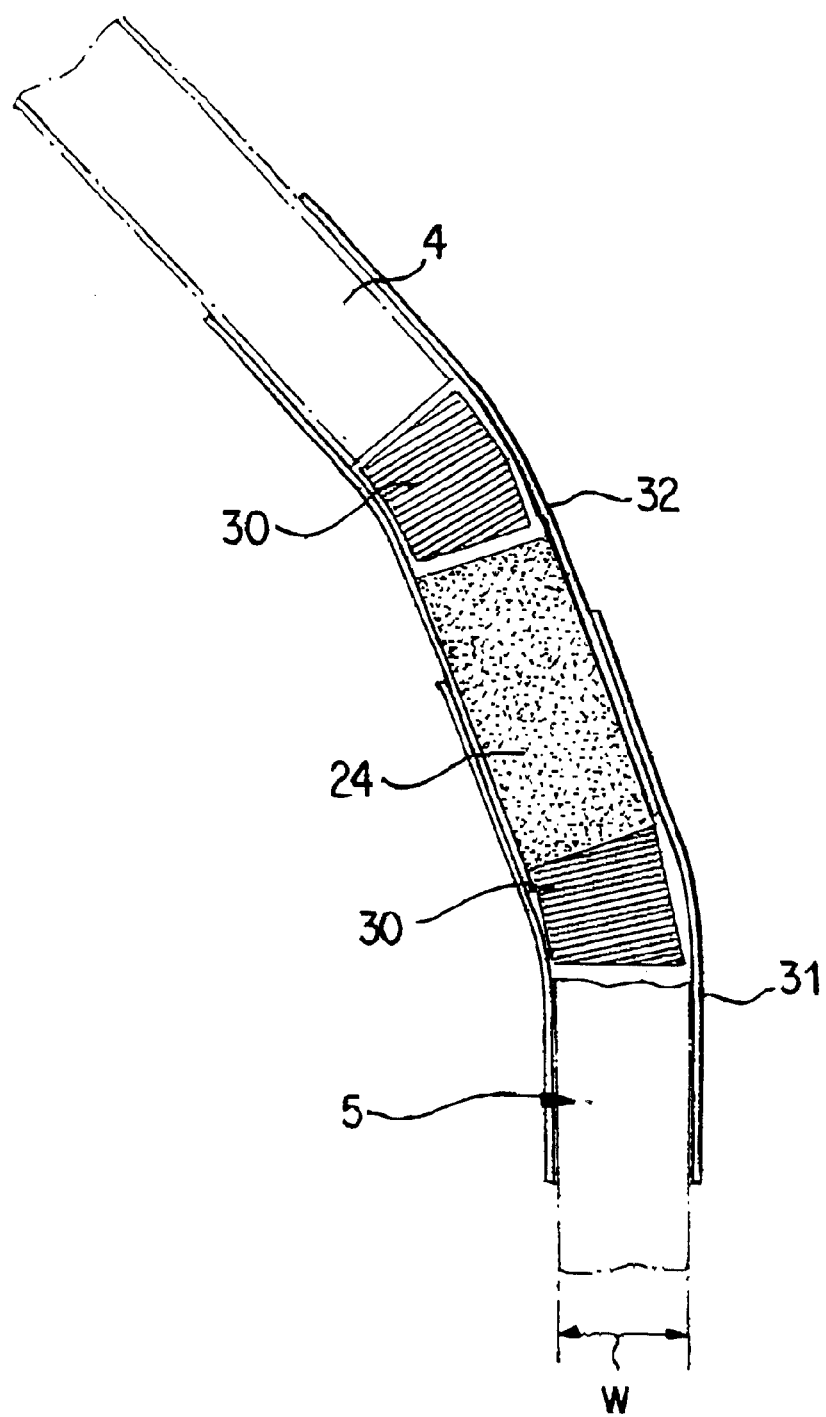
FIG. 5 is an enlarged sectional view of a connecting ring assembly for connecting the conical structural part and the cylindrical structural part of FIG. 1, constructed according to a third preferred embodiment of the present invention.

In the embodiment of FIG. 3, an exemplary diameter D for the cylindrical structural sandwich part 2 is 5.40 meters and the sandwich constructions 1 and 2 have a width W of 29.8 millimeters. In the embodiment of FIG. 4, the diameter D is 2.624 meters and the width W of the sandwich 3 is 30.2 millimeters. In the embodiment of FIG. 5, the diameter D of the cylindrical part 5 is 4.545 meters and the width W of the sandwich construction 5 is 16.4 millimeters. These exemplary dimensionals ranges are provided by way of example only as to the types of arrangements with which the novel ring assemblies of the present invention can be used.

In order to be able to meet the demand for a high circumferential stiffness under these conditions while the weight is low at the same time, it is suggested according to the embodiment of the invention illustrated in FIGS. 3 and 4 to use the same in unidirectional continuously wound reinforcement 20, 20' made of CFRP and the existing U-shaped space 10U, 12U of the metallic ring 10, 12. This reinforcement 20, 20' of CFRP is provided instead of a thickening of the aluminum ring 10, 12. Since, in the case of the Ariane 5, for example, a ring diameter of 5.40 meters is required, the use of the specific light-weight wound reinforcement 20, 20' of CFRP results in substantial weight savings as compared to the prior art thickened aluminum ring structures. The carbon fibers extend in the direction of the circumferential lines of the rotationally symmetrical light-weight structure. Preferably, high-modulus fibers (modulus of elasticity of at least 300 GPa) are used.

The superiority of the continuously wound reinforcement ring of CFRP in comparison to an aluminum alloy is expressed best by a comparison of characteristic numbers of the materials most important in this case. For the unidirectional reinforcement ring, a high-modulus fiber, such as M55JB-6K-50B, typical for use in space, and the resin system Rütapox L20/SL, are used and, for the aluminum, the aluminum alloy 3.4364 T7351 used in the case of Ariane 5, is used.

When the two materials are compared with respect to their weight under the aspect of the same total stiffness (E*A) with E: modulus of elasticity, and A: cross-sectional surface of the CFRP ring, the following result is obtained by means of the materials used in the example:

| Material | Aluminum Alloy | CFRP |
| --- | --- | --- |
| Modulus of Elast.[N/mm$^2$] | 70,000 | 310,000 |
| Spec. Mass [kg/m$^3$] | 2,800 | 1,587 |

$(E \cdot A)_{AlU} = (E \cdot A)_{CFK}$ $$\frac{A_{ALU}}{A_{CFK}} = \frac{E_{CFK}}{E_{ALU}}$$

$$\frac{G_{ALU}}{G_{CFK}} = \frac{A_{ALU} \cdot L \cdot \rho_{AL}}{A_{CFK} \cdot L \cdot \rho_{CFK}}$$

$$\frac{G_{ALU}}{G_{CFK}} = \frac{E_{CFK}}{E_{ALU}} \cdot \frac{\rho_{AL}}{\rho_{CFK}} = \frac{310000 \text{ N/mm}^2}{70000 \text{ N/mm}^2} \cdot \frac{2800 \text{ kg/m}^3}{1587 \text{ kg/m}^3} = 7,81[-]$$

This means that, while the overall stiffness (E*A) is the same, the weight of the comparable aluminum design would be 7.8 times heavier than the construction with the CFRP reinforcement or, in other words, only 12.8% of the weight of the aluminum construction is required when the ring is reinforced with the CFRP.

The CFRP reinforcement 20, 20' comprises wet rovings or preimpregnated rovings which are entered into the basic ring 10, 12 before the integration into the connection structures. In this case, the aluminum ring 10, 12 forms the housing or the preform for the CFRP reinforcement 20, 20'. This can take place on a winding machine or a rotary table, or, with fewer devices, the rovings can be inserted manually as preimpregnated rovings or wet. Subsequently, a heat treatment can take place, depending on the outside environmental conditions which the component experiences when in use.

In order to achieve a certain stiffness, a corresponding fiber quantity must be inserted, the resin fraction not being very significant. A fiber volume of from 50% to 60% is endeavored. The total stiffness (E*A) defined by the quantity of the fibers does not change, only the weight increases if more resin is used or vice versa. A higher resin fraction is advantageous in that it simplifies the manufacturing process. Depending on the construction of the aluminum profiles, the CFRP rovings can be inserted from any side (from the inside, outside, top, bottom and diagonally).

If the structures at the cone/cylinder transition do not have to have an interface with another structure such as flange 7 of FIG. 3, a metallic connection ring can be eliminated completely, such as illustrated in FIG. 5. Instead, this ring is replaced by a CFRP ring 24 which, as described above, consists of unidirectional carbon fibers and is produced in a corresponding laminating mold in the same manner as described above. This construction is illustrated in FIG. 3, the CFRP ring 24 being connected directly with the sandwiches of the cylindrical structural part 5 and of the conical structural part 4 by surrounding shear lap joints 31, 32 (predominately glued) on the exterior and interior side. The lap joints take over the task of transmitting the high forces of the sandwich cover layers between the conical structure and the cylindrical structure. Also in this construction, high-modulus fibers with a modulus of elasticity of greater than 300 GPa can advantageously be used. Reference number 30 denotes a heavy honeycomb core.

Following are definitions of Artisan terms used herein:

CFRP: Carbon-Fiber-Reinforced Plastic

Design: Plan, Construction, Dimensioning

Interface: Mechanical Connection between Two Structures

Roving: Fiber Strand Consisting of Many Thousand Parallel Individual Fibers

Fiber Volume: Volume-Type Fraction of Fibers in a Mixture of Fibers and Resin

Sandwich: Light Dent-Resistant Plate Consisting of Thin Cover Layers (such as Aluminum, CFRP) and a Thick Core Material (such as Aluminum Honeyweb, Foam).

Meridian Line: Intersection Line of the Rotationally Symmetrical Light-Weight Structure with a Plane in Which the Axis of Rotation Is Situated.

Circumferential

Line: Intersection Line of the Rotationally Symmetrical Light-Weight Structure with a Plane which Is Situated Perpendicular with Respect to the Axis of Rotation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Ring assembly connecting two rotationally symmetrical structural parts to form a rotationally symmetrical light-weight structure where a change of slope of a meridian line of the light-weight structure is situated at the transition between the two structural parts, wherein a ring includes a continuously wound reinforcement ring of unidirectional carbon fiber reinforced plastic which has carbon fibers oriented in circumferential direction of the structural parts.

2. Ring assembly according to claim 1,
wherein the ring assembly comprises a metallic basic ring in whose cross-section the surrounding continuously wound reinforcement ring is embedded.

3. Ring assembly according to claim 2,
wherein the metallic basic ring has in its cross-section an indentation open in a direction of one of the structural parts, the surrounding reinforcement ring of being embedded in this indentation.

4. Ring assembly according to claim 1,
wherein the ring assembly consists exclusively of the continuous wound reinforcement ring without a metallic basic ring.

5. Ring assembly according to claim 4,
wherein the continuously wound reinforcement ring is connected by means of shear lap joints with the structural parts.

6. Ring assembly according to the claim 1,
wherein the structural parts consist of a sandwich material.

7. Ring assembly according to claim 2,
wherein the structural parts consist of a sandwich material.

8. Ring assembly according to claim 3,
wherein the structural parts consist of a sandwich material.

9. Ring assembly according to claim 4,
wherein the structural parts consist of a sandwich material.

10. Ring assembly according to claim 5,
wherein the structural parts consist of a sandwich material.

11. Ring assembly according to claim 5, wherein the shear lap joints are formed as layers of carbon fiber reinforced plastic with a modulus of elasticity greater than 300 GPa.

12. Ring assembly according to claim 5, wherein the carbon fiber reinforced plastic forming the reinforced ring has a modulus of elasticity greater than 300 GPa.

13. Ring assembly connecting a conical structural part with a cylindrical structural part, comprising:
a wound reinforcement ring of carbon fiber reinforced plastic which extends circumferentially of and intermediate the conical and cylindrical structural parts, carbon fibers of said reinforcement ring being oriented in a circumferential direction of the structural parts.

14. Ring assembly according to claim 13, further comprising a metallic base ring connectible in use to each of the structural parts and having an opening cross section containing the wound reinforcement ring.

15. Ring assembly according to claim 13,
wherein each of said structural parts are formed of honeycomb sandwich material.

16. Ring assembly according to claim 14,
wherein each of said structural parts are formed of honeycomb sandwich material.

17. Ring assembly according to claim 13, further comprising shear lap joints for connecting the ring assembly to said structures.

18. Ring assembly according to claim 14, further comprising shear lap joints for connecting the ring assembly to said structures.

19. Ring assembly according to claim 15, further comprising shear lap joints for connecting the ring assembly to said structures.

20. Ring assembly according to claim 16, further comprising shear lap joints for connecting the ring assembly to said structures.

21. Ring assembly according to claim 16, wherein said reinforcement ring has a diameter greater than two meters.

22. A method of making a reinforced light-weight ring assembly for connecting a conical structural part with a cylindrical structural part comprising:
extending a wound reinforcement ring of carbon fiber reinforced plastic circumferentially around and intermediate facing parts of the structural parts with orientation of carbon fibers in said reinforcement ring in a circumferential direction of said structural parts.

23. A method according to claim 22,
wherein said structural parts are made of honeycomb sandwich material,
said method including interposing a metallic base ring between and connected to end sections of the structural parts, with an annular opening of said metallic base ring containing the reinforcement ring.

24. A method according to claim 22,
wherein said structural parts are made of honeycomb sandwich material,
said method including directly connecting said reinforcement to said structures using shear lap joints extending over and attached to end sections of said structures and to said reinforcement ring.

* * * * *